US009111448B2

(12) United States Patent
Yester

(10) Patent No.: US 9,111,448 B2
(45) Date of Patent: *Aug. 18, 2015

(54) WARNING SYSTEM FOR A MOTOR VEHICLE DETERMINING AN ESTIMATED INTERSECTION CONTROL

(71) Applicant: Honda Motor Co., Ltd., Tokyo, Minato-ku (JP)

(72) Inventor: John L. Yester, Birmingham, MI (US)

(73) Assignee: Honda Motor Co., Ltd., Tokyo (JP)

( * ) Notice: Subject to any disclaimer, the term of this patent is extended or adjusted under 35 U.S.C. 154(b) by 16 days.

This patent is subject to a terminal disclaimer.

(21) Appl. No.: 14/174,934

(22) Filed: Feb. 7, 2014

(65) Prior Publication Data

US 2014/0218214 A1 Aug. 7, 2014

Related U.S. Application Data

(63) Continuation of application No. 12/874,499, filed on Sep. 2, 2010, now Pat. No. 8,823,556.

(51) Int. Cl.

| | |
|---|---|
| ***G08G 1/0967*** | (2006.01) |
| ***G08G 1/07*** | (2006.01) |
| ***G08G 1/123*** | (2006.01) |
| ***G06F 19/00*** | (2011.01) |
| ***G06G 1/00*** | (2006.01) |

(52) U.S. Cl.

CPC ................ *G08G 1/0967* (2013.01); *G08G 1/07* (2013.01)

(58) Field of Classification Search

USPC .................... 340/995, 913, 988, 990, 995.28; 701/118, 119, 120

See application file for complete search history.

(56) References Cited

U.S. PATENT DOCUMENTS

| | | | |
|---|---|---|---|
| 5,289,181 A | 2/1994 | Watanabe et al. | |
| 5,485,161 A | 1/1996 | Vaughn | |
| 5,539,398 A | 7/1996 | Hall et al. | |
| 5,873,674 A * | 2/1999 | Hohl | 404/9 |
| 5,939,976 A | 8/1999 | Sasaki et al. | |

(Continued)

FOREIGN PATENT DOCUMENTS

| | | |
|---|---|---|
| JP | 2005006081 | 1/2005 |
| JP | 2005165643 | 6/2005 |

(Continued)

OTHER PUBLICATIONS

The International Search Report and the Written Opinion of the International Searching Authority, or The Declaration mailed in PCT Application No. PCT/US2010/051761.

(Continued)

*Primary Examiner* — Fekadeselassie Girma

(74) *Attorney, Agent, or Firm* — Plumsea Law Group, LLC

(57) ABSTRACT

A warning system for a motor vehicle includes a control system for estimating the type of intersection control for two or more roadways. The method of estimating the type of intersection control includes steps of classifying each roadway at an intersection and estimating the type of intersection control used for each roadway. Roadways can be classified by size, traveling speed, number of lanes as well as any other roadway characteristics. The warning system can be operated using the estimated intersection control device for each roadway. In some cases, information from a target vehicle can be used to determine a potential violation of an intersection control device.

20 Claims, 11 Drawing Sheets

(56) References Cited

U.S. PATENT DOCUMENTS

| | | | | |
|---|---|---|---|---|
| 5,940,010 | A | 8/1999 | Sasaki et al. | |
| 5,999,878 | A | 12/1999 | Hanson et al. | |
| 6,047,234 | A * | 4/2000 | Cherveny et al. | 701/451 |
| 6,163,750 | A | 12/2000 | Nojima | |
| 6,169,495 | B1 | 1/2001 | Koike | |
| 6,307,484 | B1 | 10/2001 | Sasaki et al. | |
| 6,338,021 | B1 * | 1/2002 | Yagyu et al. | 701/533 |
| 6,356,840 | B2 | 3/2002 | Kusama | |
| 6,370,475 | B1 | 4/2002 | Breed et al. | |
| 6,385,539 | B1 | 5/2002 | Wilson et al. | |
| 6,405,128 | B1 | 6/2002 | Bechtolsheim et al. | |
| 6,405,132 | B1 | 6/2002 | Breed et al. | |
| 6,516,267 | B1 | 2/2003 | Cherveny et al. | |
| 6,516,273 | B1 * | 2/2003 | Pierowicz et al. | 701/301 |
| 6,526,348 | B1 | 2/2003 | McDonough | |
| 6,526,352 | B1 | 2/2003 | Breed et al. | |
| 6,624,782 | B2 * | 9/2003 | Jocoy et al. | 342/70 |
| 6,640,188 | B2 | 10/2003 | Hashida | |
| 6,658,356 | B2 | 12/2003 | Chen et al. | |
| 6,700,504 | B1 * | 3/2004 | Aslandogan et al. | 340/901 |
| 6,720,920 | B2 | 4/2004 | Breed et al. | |
| 6,735,515 | B2 | 5/2004 | Bechtolsheim et al. | |
| 6,763,301 | B2 | 7/2004 | McDonough | |
| 6,768,944 | B2 | 7/2004 | Breed et al. | |
| 6,810,327 | B2 | 10/2004 | Akashi | |
| 6,816,779 | B2 | 11/2004 | Chen et al. | |
| 6,836,781 | B2 | 12/2004 | McDonough | |
| 6,853,913 | B2 * | 2/2005 | Cherveny et al. | 701/461 |
| 6,859,731 | B2 | 2/2005 | Takafuji et al. | |
| 6,865,479 | B2 | 3/2005 | Chen et al. | |
| 6,868,410 | B2 | 3/2005 | Fortin et al. | |
| 7,046,827 | B2 | 5/2006 | Chen et al. | |
| 7,072,764 | B2 | 7/2006 | Donath et al. | |
| 7,076,365 | B2 * | 7/2006 | Tzamaloukas | 701/495 |
| 7,079,946 | B2 | 7/2006 | Hunzinger | |
| 7,085,637 | B2 | 8/2006 | Breed et al. | |
| 7,102,496 | B1 * | 9/2006 | Ernst et al. | 340/436 |
| 7,110,880 | B2 | 9/2006 | Breed et al. | |
| 7,124,025 | B2 | 10/2006 | Okada et al. | |
| 7,124,027 | B1 | 10/2006 | Ernst, Jr. et al. | |
| 7,133,775 | B2 | 11/2006 | Adamski et al. | |
| 7,151,467 | B2 | 12/2006 | Fujita et al. | |
| 7,188,026 | B2 * | 3/2007 | Tzamaloukas | 701/522 |
| 7,194,347 | B2 | 3/2007 | Harumoto et al. | |
| 7,202,776 | B2 | 4/2007 | Breed | |
| 7,209,051 | B2 | 4/2007 | Shankwitz et al. | |
| 7,295,925 | B2 | 11/2007 | Breed et al. | |
| 7,317,406 | B2 | 1/2008 | Wolterman | |
| 7,406,381 | B2 | 7/2008 | Obata | |
| 7,418,346 | B2 | 8/2008 | Breed et al. | |
| 7,426,437 | B2 | 9/2008 | Breed et al. | |
| 7,433,889 | B1 * | 10/2008 | Barton | 1/1 |
| 7,440,830 | B2 | 10/2008 | Isaji et al. | |
| 7,440,850 | B2 | 10/2008 | Kim | |
| 7,486,202 | B2 | 2/2009 | Konishi et al. | |
| 7,519,472 | B1 | 4/2009 | Grigsby et al. | |
| 7,580,791 | B2 * | 8/2009 | Froeberg | 701/420 |
| 7,636,632 | B2 * | 12/2009 | Wolterman | 701/450 |
| 7,720,026 | B2 | 5/2010 | Chen et al. | |
| 7,840,330 | B2 * | 11/2010 | Heinrichs-Bartscher | 701/96 |
| 8,095,266 | B2 | 1/2012 | Kim | |
| 8,095,308 | B2 * | 1/2012 | Tsuji | 701/437 |
| 8,442,791 | B2 * | 5/2013 | Stahlin | 702/94 |
| 2002/0036584 | A1 * | 3/2002 | Jocoy et al. | 342/70 |
| 2003/0016143 | A1 | 1/2003 | Ghazarian | |
| 2003/0134645 | A1 | 7/2003 | Stern et al. | |
| 2004/0230373 | A1 * | 11/2004 | Tzamaloukas | 701/208 |
| 2004/0236543 | A1 | 11/2004 | Stephens | |
| 2005/0033505 | A1 | 2/2005 | Zatz | |
| 2005/0143889 | A1 | 6/2005 | Isaji et al. | |
| 2005/0210386 | A1 * | 9/2005 | Schaffer | 715/700 |
| 2006/0121868 | A1 * | 6/2006 | Jutori | 455/238.1 |
| 2006/0173611 | A1 | 8/2006 | Takagi et al. | |
| 2007/0005609 | A1 | 1/2007 | Breed | |
| 2007/0013497 | A1 | 1/2007 | Watanabe | |
| 2007/0021915 | A1 | 1/2007 | Breed et al. | |
| 2007/0027583 | A1 | 2/2007 | Tamir et al. | |
| 2007/0073463 | A1 | 3/2007 | Sherony et al. | |
| 2007/0124067 | A1 | 5/2007 | Kim et al. | |
| 2007/0171095 | A1 | 7/2007 | Mochizuki | |
| 2007/0208493 | A1 | 9/2007 | Downs et al. | |
| 2007/0208494 | A1 | 9/2007 | Chapman et al. | |
| 2007/0208495 | A1 | 9/2007 | Chapman et al. | |
| 2007/0208496 | A1 | 9/2007 | Downs et al. | |
| 2007/0208501 | A1 | 9/2007 | Downs et al. | |
| 2007/0271029 | A1 * | 11/2007 | Tzamaloukas | 701/200 |
| 2007/0276600 | A1 | 11/2007 | King et al. | |
| 2007/0280503 | A1 | 12/2007 | Kubota et al. | |
| 2007/0282532 | A1 | 12/2007 | Yamamoto et al. | |
| 2008/0015771 | A1 | 1/2008 | Breed et al. | |
| 2008/0015772 | A1 | 1/2008 | Sanma et al. | |
| 2008/0021641 | A1 | 1/2008 | Kim | |
| 2008/0024323 | A1 | 1/2008 | Kadaba | |
| 2008/0040023 | A1 | 2/2008 | Breed et al. | |
| 2008/0040029 | A1 | 2/2008 | Breed | |
| 2008/0040032 | A1 | 2/2008 | Ohashi | |
| 2008/0042815 | A1 | 2/2008 | Breed et al. | |
| 2008/0046165 | A1 | 2/2008 | Downs et al. | |
| 2008/0071465 | A1 | 3/2008 | Chapman et al. | |
| 2008/0106436 | A1 | 5/2008 | Breed | |
| 2008/0120025 | A1 | 5/2008 | Naitou et al. | |
| 2008/0128190 | A1 | 6/2008 | Tsutsumi et al. | |
| 2008/0133136 | A1 | 6/2008 | Breed et al. | |
| 2008/0140318 | A1 | 6/2008 | Breed | |
| 2008/0147253 | A1 | 6/2008 | Breed | |
| 2008/0150786 | A1 | 6/2008 | Breed | |
| 2008/0154495 | A1 | 6/2008 | Breed | |
| 2008/0154629 | A1 | 6/2008 | Breed et al. | |
| 2008/0161986 | A1 | 7/2008 | Breed | |
| 2008/0161987 | A1 | 7/2008 | Breed | |
| 2008/0162027 | A1 * | 7/2008 | Murphy et al. | 701/117 |
| 2008/0162036 | A1 | 7/2008 | Breed | |
| 2008/0165018 | A1 | 7/2008 | Breed | |
| 2008/0167819 | A1 | 7/2008 | Breed | |
| 2008/0167821 | A1 | 7/2008 | Breed | |
| 2008/0204277 | A1 | 8/2008 | Sumner | |
| 2008/0215202 | A1 | 9/2008 | Breed | |
| 2008/0215231 | A1 | 9/2008 | Breed | |
| 2008/0243378 | A1 | 10/2008 | Zavoli | |
| 2009/0030605 | A1 | 1/2009 | Breed | |
| 2009/0033540 | A1 * | 2/2009 | Breed et al. | 342/29 |
| 2009/0043497 | A1 | 2/2009 | Tashev et al. | |
| 2009/0043506 | A1 * | 2/2009 | Breed | 701/214 |
| 2009/0048750 | A1 | 2/2009 | Breed | |
| 2009/0070031 | A1 | 3/2009 | Ginsberg | |
| 2009/0082917 | A1 | 3/2009 | Adachi | |
| 2009/0102629 | A1 * | 4/2009 | Kaller et al. | 340/435 |
| 2009/0169055 | A1 * | 7/2009 | Ishikawa | 382/104 |
| 2009/0216431 | A1 * | 8/2009 | Vu et al. | 701/201 |
| 2009/0224942 | A1 | 9/2009 | Goudy et al. | |
| 2009/0252376 | A1 * | 10/2009 | Retterath et al. | 382/104 |
| 2009/0299626 | A1 * | 12/2009 | Denaro | 701/209 |
| 2009/0312942 | A1 * | 12/2009 | Froeberg | 701/200 |
| 2010/0017117 | A1 * | 1/2010 | Irie et al. | 701/208 |
| 2010/0036599 | A1 * | 2/2010 | Froeberg et al. | 701/200 |
| 2010/0106413 | A1 * | 4/2010 | Mudalige | 701/213 |
| 2010/0228437 | A1 * | 9/2010 | Hanzawa et al. | 701/41 |
| 2010/0295705 | A1 * | 11/2010 | Walter et al. | 340/937 |
| 2011/0071801 | A1 * | 3/2011 | Carrasco et al. | 703/1 |
| 2011/0280453 | A1 * | 11/2011 | Chen et al. | 382/113 |
| 2011/0288871 | A1 * | 11/2011 | Suzuki | 704/275 |
| 2012/0025965 | A1 * | 2/2012 | Mochizuki et al. | 340/435 |
| 2012/0056756 | A1 * | 3/2012 | Yester | 340/901 |
| 2012/0271483 | A1 * | 10/2012 | Samukawa et al. | 701/1 |
| 2013/0063599 | A1 * | 3/2013 | Imai et al. | 348/148 |
| 2013/0073204 | A1 * | 3/2013 | Vu et al. | 701/533 |
| 2013/0135118 | A1 * | 5/2013 | Ricci | 340/932.2 |

FOREIGN PATENT DOCUMENTS

| | | |
|---|---|---|
| JP | 2005182310 | 7/2005 |
| JP | 2005242943 | 9/2005 |
| JP | 2006011607 | 1/2006 |
| JP | 2007141114 | 6/2007 |

(56) References Cited

FOREIGN PATENT DOCUMENTS

| | | |
|---|---|---|
| JP | 2007200052 | 8/2007 |
| JP | 2007279004 | 10/2007 |
| JP | 2007328573 | 12/2007 |
| JP | 2008009870 | 1/2008 |
| JP | 2008062787 | 3/2008 |
| JP | 2008101458 | 5/2008 |
| JP | 2008132894 | 6/2008 |
| JP | 2008198162 | 8/2008 |
| JP | 2008276688 | 11/2008 |
| JP | 2009031837 | 2/2009 |

OTHER PUBLICATIONS

International Search Report and Written Opinion mailed Dec. 12, 2011 in International Application No. PCT/US2010/60695.

International Search Report and Written Opinion mailed Apr. 20, 2012 in International Application No. PCT/US2012/021844.

International Preliminary Report on Patentability (including Written Opinion of the ISA) mailed Apr. 19, 2012 in International Application No. PCT/US2010/051761.

International Preliminary Report on Patentability (including Written Opinion of the ISA) mailed Aug. 1, 2013 in International Application No. PCT/US2012/021844.

Japanese Office Action dated Aug. 6, 2013 in Japanese Patent Application No. 2012-544815.

* cited by examiner

| INTERSECTION CONTROL TABLE | | | |
|---|---|---|---|
| ROADWAY #1 | ROADWAY #2 | INTERSECTION CONTROL FOR ROADWAY #1 | INTERSECTION CONTROL FOR ROADWAY #2 |
| 1 | 4 | NONE | STOP SIGN |
| 1 | 3 | NONE | TRAFFIC LIGHT |
| 2 | 5 | NONE | STOP SIGN |
| 3 | 3 | TRAFFIC LIGHT | TRAFFIC LIGHT |
| 4 | 4 | STOP SIGN | STOP SIGN |
| ⋮ | ⋮ | ⋮ | ⋮ |

WARNING SYSTEM FOR A MOTOR VEHICLE DETERMINING AN ESTIMATED INTERSECTION CONTROL

CROSS REFERENCE TO RELATED APPLICATION

This application is a continuation of U.S. Pat. No. 8,823,556, currently U.S. application Ser. No. 12/874,499, entitled “Method of Estimating Intersection Control,” filed on Sep. 2, 2010, and allowed on Nov. 15, 2013, the contents of which are hereby incorporated by reference in its entirety into this disclosure.

BACKGROUND

The present invention relates generally to a motor vehicle, and in particular to a method of estimating intersection control.

Methods of determining how traffic should behave at an intersection have been previously proposed. These methods include systems that store the type of intersection control (e.g. stop-signs and traffic signals) for each roadway leading to an intersection. These methods require a great deal of effort to learn the traffic control types for each roadway at each intersection. Many times data are not available for all roadways and at all intersections.

SUMMARY

In some cases, a method of controlling a motor vehicle includes A method of controlling a motor vehicle includes steps of retrieving a first characteristic of a first roadway and retrieving a second characteristic of a second roadway. In some cases, the first roadway may be associated with a first class using the first characteristic and the second roadway may be associated with a second class using the second characteristic. In some cases, the first class and the second class may be compared. In addition, in some cases, a type of intersection control device may be determined using the first class and the second class where the intersection control device is associated with the first roadway.

In some embodiments, a method of controlling a motor vehicle includes retrieving a first characteristic of a first roadway and retrieving a second characteristic of a second roadway. In some cases, the first roadway is associated with a first class using the first characteristic and the second roadway is associated with a second class using the second characteristic. In some cases, the first class and the second class may be compared to determine if the first roadway is controlled by an intersection control device and to determine if the second roadway is controlled by an intersection control device.

In some embodiments, a method of controlling a motor vehicle includes retrieving a first characteristic of a first roadway and retrieving a second characteristic of a second roadway. In some cases, the first roadway is associated with a first class using the first characteristic and the second roadway is associated with a second class using the second characteristic. In some cases, the first class and the second class may be compared to determine a type of intersection control device using the first class and the second class, where the intersection control device is associated with the first roadway. In some cases, the method may also include steps of receiving information from a target vehicle and retrieving information about host vehicle as well as controlling a warning system using the type of intersection control device for the first roadway.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
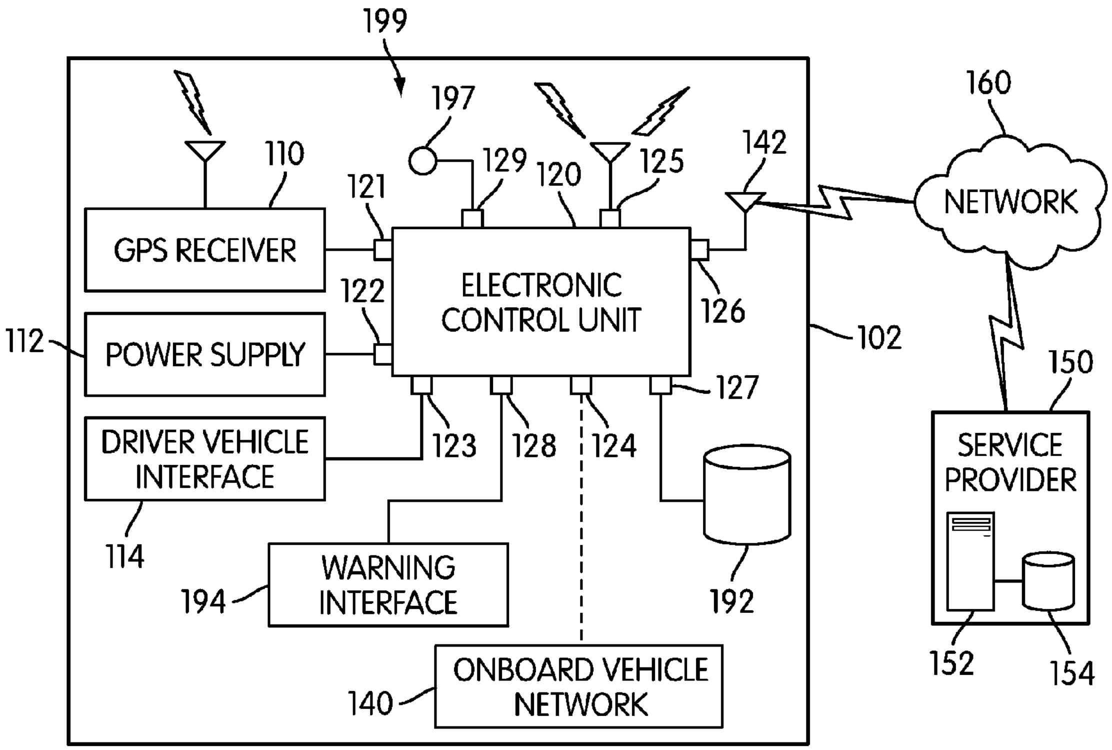
FIG. 1 is a schematic view of an embodiment of a motor vehicle including a control system.

FIG. 1 is a schematic view of a motor vehicle 102 according to an embodiment of the invention. The term "motor vehicle" as used throughout the specification and claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drive train is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

For purposes of clarity, only some components of motor vehicle 102 may be shown. Furthermore, in other embodiments, additional components can be added or removed.

Motor vehicle 102 can include provisions for receiving GPS information. In some cases, motor vehicle 102 can include GPS receiver 110. In an exemplary embodiment, GPS receiver 110 can be used for gathering GPS information for any systems of a motor vehicle, including, but not limited to: GPS based navigation systems.

Motor vehicle 102 can include provisions for powering one or more devices. In some cases, motor vehicle 102 can include power supply 112. Generally, power supply 112 can be any type of power supply associated with a motor vehicle. In some cases, power supply 112 can be a car battery. In other cases, power supply 112 can be another type of power supply available within motor vehicle 102.

Motor vehicle 102 can include provisions for communicating with a driver. In some embodiments, motor vehicle 102 can include driver vehicle interface 114. In some cases, driver vehicle interface 114 can include provisions for transmitting information to a driver and/or passenger. In other cases, driver vehicle interface 114 can include provisions for receiving information from a driver and/or passenger. In an exemplary embodiment, driver vehicle interface 114 can include provisions for transmitting and receiving information from a driver and/or passenger.

Motor vehicle 102 may include provisions for communicating, and in some cases controlling, the various components associated with motor vehicle 102. In some embodiments, motor vehicle 102 may be associated with a computer or similar device. In the current embodiment, motor vehicle 102 may include electronic control unit 120, hereby referred to as ECU 120. In one embodiment, ECU 120 may be configured to communicate with, and/or control, various components of motor vehicle 102. In addition, in some embodiments, ECU

120 may be configured to control additional components of a motor vehicle that are not shown.

ECU 120 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 120 are optional. Some embodiments may include a given port or provision, while others may exclude it. The following description discloses many of the possible ports and provisions that can be used, however, it should be kept in mind that not every port or provision must be used or included in a given embodiment.

In some embodiments, ECU 120 can include port 121 for communicating with GPS receiver 110. In particular, ECU 120 may be configured to receive GPS information from GPS receiver 110. In addition, ECU 120 can include port 122 for receiving power from power supply 112. Also, ECU 120 can include port 123 for communicating with driver vehicle interface 114. In particular, ECU 120 can be configured to transmit information to driver vehicle interface 114, as well as to receive information from driver vehicle interface 114.

A motor vehicle can include provisions for communicating with one or more vehicles using a vehicle communication network. The term "vehicle communication network" as used throughout this detailed description and in the claims refers to any network using motor vehicles and roadside units as nodes. Vehicle communication networks may be used for exchanging various types of information between motor vehicles and/or roadside units. An example of such a vehicular network is a dedicated short range communication (DSRC) network, which may be governed by SAE J2735, IEEE 1609 as well as 802.11 standards. In some cases, DSRC networks may be configured to operate in the 5.9 GHz band with bandwidth of approximately 75 MHz. Furthermore, DSRC networks may have a range of approximately 1000 m.

In some embodiments, ECU 120 may include port 125 that is configured to communicate with one or more DSRC devices. In one embodiment, port 125 may be associated with a DSRC antenna that is configured to transmit and/or receive vehicle information over one or more vehicle communication networks.

ECU 120 can include provisions for receiving information related to a vehicle speed. In one embodiment, ECU 120 may include port 129 for receiving information from vehicle speed sensor 197. Vehicle speed sensor 197 can be any type of speed sensor including a wheel sensor or any other kind of speed sensor.

In some cases, ECU 120 may include additional ports for communicating directly with one or more additional devices of a motor vehicle, including various sensors or systems of the motor vehicle. In an exemplary embodiment, ECU 120 may include port 124 for communicating with onboard vehicle network 140, which comprises a network between various components and/or systems onboard of motor vehicle 102. By providing communication between ECU 120 and onboard vehicle network 140, ECU 120 may have access to additional information concerning motor vehicle 102. For instance, in some cases, ECU 120 may be configured to receive information related to various operating conditions of a motor vehicle. Examples of information that may be received via onboard vehicle network 140 include, but are not limited to: vehicle speed, engine speed, braking conditions, as well as other parameters associated with the operating conditions of motor vehicle 102.

In some embodiments, motor vehicle 102 can be associated with an active safety system. The term "active safety system" as used throughout the detailed description and in the claims refers to any system that facilitates safety in a motor vehicle. For example, an active safety system may include a warning system that monitors roadway conditions. A warning system may be configured to provide information and/or warnings to a driver about any potentially dangerous driving conditions. For example, in some cases a warning system may be configured to warn a driver about threats of a collision with a vehicle upon passing through an intersection. In other cases, a warning system can be used to warn a driver of a potential stop-sign violation. In still other cases, a warning system can be used to warn a driver of a potential traffic signal violation. Warning systems are only one type of active safety system that can be utilized and in other embodiments additional active safety systems can be used including, but not limited to: intelligent speed adaptation, anti-lock braking system, electronic stability control, brake assist, traction control, seat belt pre-tensioning as well as other types of active safety systems.

A warning system may be integrated into ECU 120. In some cases, a warning system may be associated with an interface of some kind. In one embodiment, motor vehicle 102 includes warning interface 194. Warning interface 194 may communicate with ECU 120 through port 128.

In some cases, warning interface 194 may be a visual indicator of some kind that alerts a driver of a potential danger. In other cases, warning interface 194 can be an audible indicator that audibly warns a driver. Moreover, in some embodiments, warning interface 194 may be integral with driver vehicle interface 114. For example, in some cases, driver vehicle interface 114 may be a touch-sensitive screen for providing and receiving navigation information. In such cases, interface 114 could also be used for providing visual warnings and/or alerts to a driver.

Motor vehicle 102 can include provisions for storing various kinds of information. In some cases, motor vehicle 102 may include one or more databases. The term "database" is used to describe any kind of storage device including, but not limited to: magnetic, optical, magneto-optical, and/or memory, including volatile memory and non-volatile memory. In the current embodiment, motor vehicle 102 may include database 192. In some cases, database 192 may be configured to store roadway information. Examples of roadway information include, but are not limited to: roadway locations, roadway size, lane count information, speed limit information, as well as other kinds of roadway information. In addition, in some embodiments, database 192 may be configured to store traffic control information. The term "traffic control" refers to any system or method for controlling the flow of traffic through an intersection. Examples of traffic control signs include, but are not limited to: stop-signs and yield signs. In addition, traffic control devices can include traffic lights or signals.

In some embodiments, database 192 may store various types of map information including any kind of navigation information. The term "navigation information" refers to any information that can be used to assist in determining a location or providing directions to a location. Some examples of navigation information include street addresses, street names, street or address numbers, apartment or suite numbers, intersection information, points of interest, parks, any political or geographical subdivision including town, township, province, prefecture, city, state, district, ZIP or postal code, and country. Navigation information can also include commercial information including business and restaurant names, commercial districts, shopping centers, and parking facilities. Navigation information can also include geographical information, including information obtained from any Global Navigational Satellite infrastructure (GNSS), including Global Positioning System or Satellite (GPS), Glonass (Russian) and/or Galileo (European). The term "GPS" is used to denote any global navigational satellite system. Navigation information can include one item of information, as well as a combination of several items of information. For example, in one embodiment, database 192 could be an onboard database used by a navigation system that stores maps and other navigation information. In other embodiments, however, database 192 may only store some kinds of information including roadway information.

Although a single database is illustrated in FIG. 1, in other embodiments, database 192 can comprise one or more databases. Databases can be integral with ECU 120 or may be separate from ECU 120. In the current embodiment, database 192 may be a separate database. In one embodiment, ECU 120 may include port 127 for communicating with database 192.

In some embodiments, roadway information may be accessed remotely. In some cases, motor vehicle 102 can access roadway information from a remote service provider. The term "service provider" as used throughout this detailed description and in the claims refers to any collection of computing resources and/or databases that are disposed outside of motor vehicle 102, which are capable of providing resources to motor vehicle 102. In some cases, service provider 150 may be a collection of networked computers or computer servers. Service provider 150 may be used to receive, process and/or store information of any kind.

Service provider 150 may include computer system 152. The term "computer system" refers to the computing resources of a single computer, a portion of the computing resources of a single computer, and/or two or more computers in communication with one another, also any of these resources can be operated by one or more human users. In one embodiment, computer system 152 includes a server.

In one embodiment, service provider 150 may be provided with database 154. Database 154 can store any kind of information including, but not limited to: navigation information, roadway information and/or traffic control information. Database 154 can communicate with computer system 152. Database 154 can include any kind of storage device, including but not limited to: magnetic, optical, magneto-optical, and/or memory, including volatile memory and non-volatile memory. In some embodiments, database 154 may be integral with computer system 152. In other embodiments, database 154 may be separate from computer system 152.

A motor vehicle can include provisions for communicating with a service provider. In one embodiment, motor vehicle 102 may communicate with service provider 150 using network 160. Generally, network 160 may be any type of network. In some cases, network 160 may be a vehicle communication network that uses motor vehicles for at least some nodes of the network. In addition, a vehicle communication network may include roadside units as nodes. Vehicle communication networks may be used for exchanging various types of information between motor vehicles and/or roadside units. An example of such a vehicular network is a dedicated short range communication (DSRC) network. In some cases, DSRC networks may be configured to operate in the 5.9 GHz band with bandwidth of approximately 75 MHz. Furthermore, DSRC networks may have a range of approximately 1000 m. In other embodiments, motor vehicle 102 can be configured to communicate with service provider 150 using any other type of wireless network, including, but not limited to: WiFi networks, cell phone networks, as well as any other type of network. Furthermore, network 160 may be associated with any type of network standard including, but not limited to: CDMA, TDMA, GSM, AMPS, PCS, analog and/or W-CDMA.

In some embodiments, ECU 120 may include port 126 that is configured to communicate with a network antenna. In an exemplary embodiment, port 126 may be associated with network antenna 142 that is configured to exchange information with service provider 150 using network 160.

Motor vehicle 102 may be associated with control system 199. In different embodiments, control system 199 can include different provisions or features of motor vehicle 102. In some cases, control system 199 may comprise one or more facilities of ECU 120. In some embodiments, control system 199 could be a safety system, such as a collision warning system. For example, in one embodiment, control system 199 may be configured to process various kinds of operating information and control a warning system accordingly. In other cases, however, control system 199 could be any other system.

For purposes of clarity, the terms "host vehicle" and "target vehicle" may be used throughout this detailed description and in the claims. The term "host vehicle" refers to a vehicle utilizing a control system as discussed above. The term "target vehicle" refers to other vehicles that may be monitored by, or otherwise communicate with, a host vehicle. In some cases, a host vehicle can be configured to communicate with target vehicles using a vehicle communication network. In other cases, a host vehicle can monitor aspects of a target vehicle using remote sensing devices including cameras, radar, lidar, as well as other remote sensing devices.

In some embodiments, a control system may monitor vehicle behavior at or near an intersection. In situations where the behavior of the host vehicle or one or more target vehicles are operating in a manner that may cause potential problems, a control system may alert a driver. In some cases, in order to determine if vehicles are passing through an intersection in a safe manner, a control system may utilize traffic control information. The traffic control information may include the existence of any traffic control devices as well as the type of traffic control devices (stop signs, yield signs, traffic signals, etc.) that control traffic through an intersection. For example, at an intersection controlled by four way stop-signs, a control system may use this information to determine if each vehicle near the intersection is intending to stop at the associated stop sign.

In some cases, traffic control information may be stored in a database of some kind. In other words, each roadway at an intersection may be associated with a particular kind of traffic control device or no traffic control device. In other cases, however, traffic control information may not be available from a database. In some embodiments, for example, traffic control information may be available for some intersections but not for others. Still further, in some cases, traffic control information may be available for some roadways at an intersection but not for other roadways at the same intersection.

In embodiments where traffic control information is not available for one or more intersections, a control system can include provisions for estimating the intersection control type. In some cases, the type of intersection control device for each roadway at an intersection can be estimated according to the roadway classification. The term "roadway classification" as used throughout this detailed description and in the claims refers to a system for classifying roadways into various classes or categories. These classes can vary in different embodiments. Examples of different classes include highways, expressways, parkways, arterial roads, collector roads, city streets, single lane roads as well as other roadway categories. Moreover, roads can be classified according to relative size, lane count, speed, traffic patterns, capacity as well as any other characteristics. Some embodiments can use one classification scheme, while others may use different classification schemes. Once each roadway has been classified using a particular classification scheme, a control system may compare the classes of each roadway at an intersection to determine the type of intersection control for each roadway.

Figure 2:
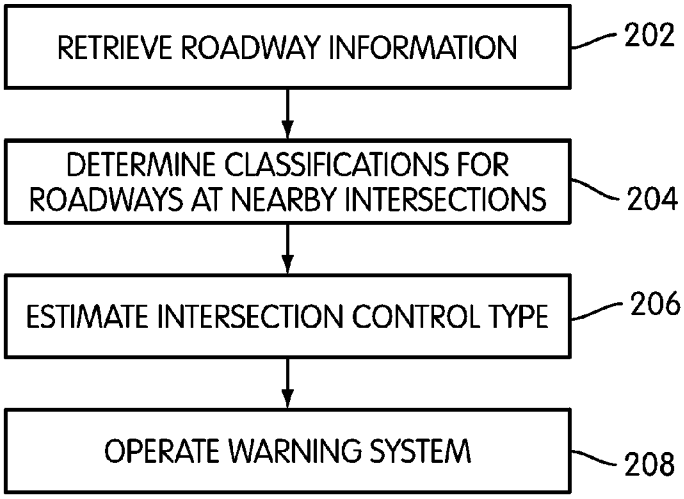
FIG. 2 is an embodiment of a process for operating a warning system in a motor vehicle.

FIG. 2 illustrates an embodiment of a method of estimating intersection control types for two or more intersecting roadways at an intersection for the purpose of operating an active safety system. In some embodiments, some of the following steps could be accomplished by a control system of a motor vehicle. In some cases, some of the following steps may be accomplished by an ECU of a motor vehicle. In other embodiments, some of the following steps could be accomplished by other components of a motor vehicle. It will be understood that in other embodiments one or more of the following steps may be optional.

During step 202, a control system may retrieve roadway information. In some cases, the roadway information could be retrieved from an onboard database. In other cases, the roadway information could be retrieved from a remote database. The remote database could be part of a service provider, for example. Moreover, the roadway information can include various different roadway characteristics including size, lane count, speed, as well as other characteristics for one or more roadways in the vicinity of a motor vehicle.

Next, during step 204, the control system may determine classifications for each roadway at one or more nearby intersections. The classifications can be based on the various roadway characteristics of each roadway. Following step 204, during step 206, the control system may estimate the intersection control type for each roadway at an intersection. Following step 206, during step 208, the control system may operate a warning system and/or any other active safety system. In some cases, the control system may monitor the behavior of any nearby target vehicles as well as the host vehicle and operate a warning system. In particular, if any vehicles do not appear to be behaving properly according to the estimated intersection control types for each roadway, the control system may provide a warning to a driver.

Figure 3:
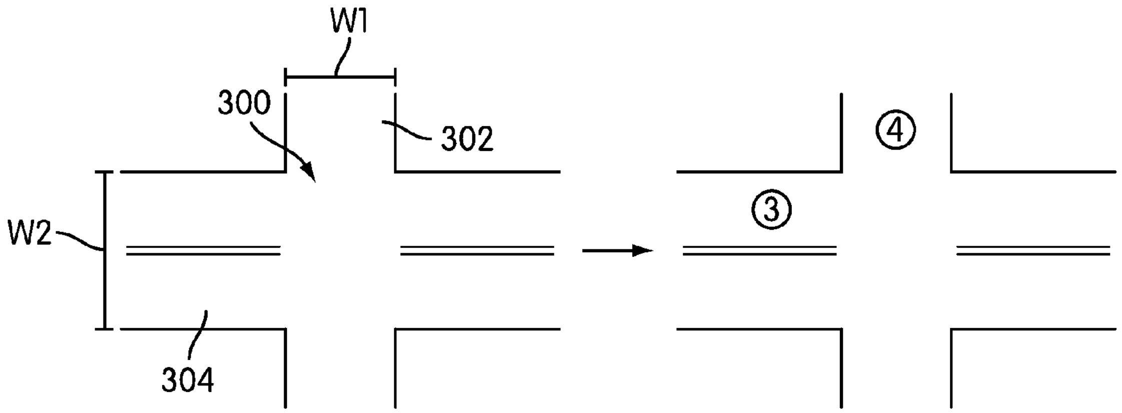
FIG. 3 is a schematic view of an embodiment of a method of classifying roadways according to size, in which each roadway is assigned to a different class.
Figure 4:
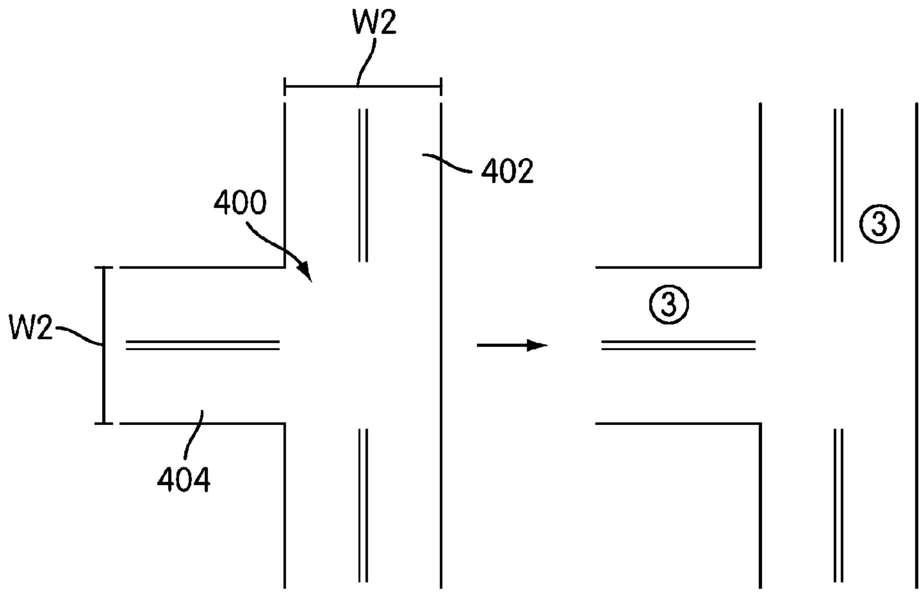
FIG. 4 is a schematic view of an embodiment of a method of classifying roadways according to size, in which each roadway is assigned to the same class.
Figure 5:
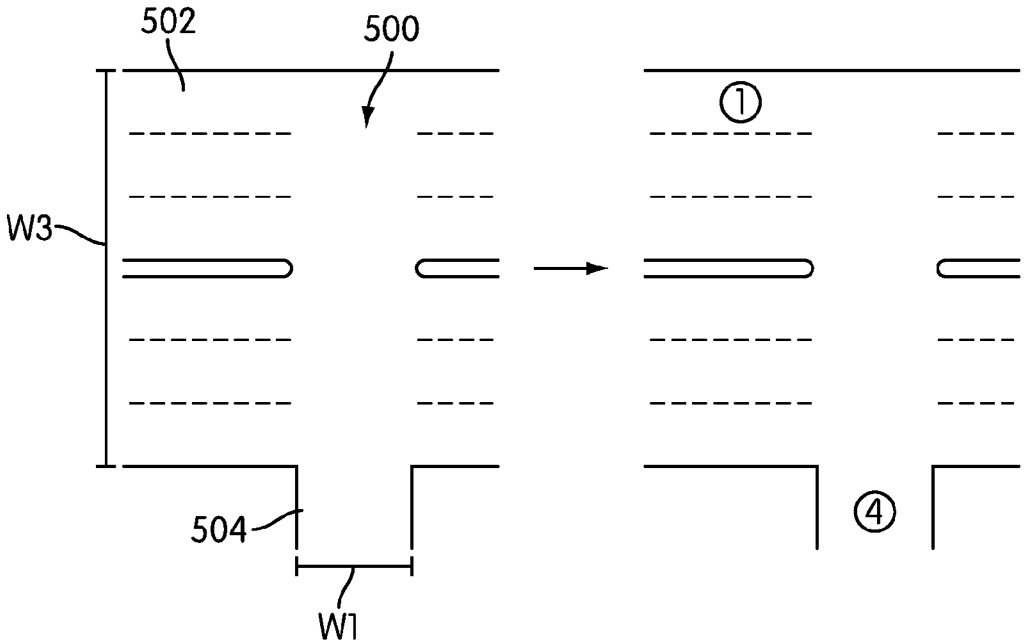
FIG. 5 is a schematic view of an embodiment of a method of classifying a major highway and a minor roadway according to size.

FIGS. 3 through 5 illustrate schematic views of various intersections in which each roadway is classified according to a size classification scheme. In particular, each roadway is classified according to width. In one embodiment, a five category classification scheme is used in which each roadway is classified into classes: 1, 2, 3, 4 and 5, where class 1 is associated with the largest roadways and class 5 is associated with the smallest roadways. Although the current embodiment uses five different classes of roadways, other embodiments could include any other number of classes.

Referring to FIG. 3, intersection 300 is formed by first roadway 302 and second roadway 304. First roadway 302 has width W1 and second roadway 304 has width W2. In this case, width W1 is substantially smaller than width W2. In one embodiment, first roadway 302 is assigned to be a class 4 roadway, while second roadway 304 is assigned to be a class 3 roadway. In this embodiment, class 3 roadways are defined to be larger than class 4 roadways. It will be understood that each class may generally be associated with a range of sizes.

Referring to FIG. 4, intersection 400 is formed by first roadway 402 and second roadway 404. In this case, both first roadway 402 and second roadway 404 have similar widths W2. In one embodiment, both first roadway 402 and second roadway 404 are assigned to be class 3 roadways. Referring to FIG. 5, intersection 500 is formed by first roadway 502 and second roadway 504. In this case, it is apparent that first roadway 502 is much larger than second roadway 504. In particular, first roadway 502 has width W3. Second roadway 504 has width W1, which is substantially smaller than width W3. In this case, first roadway 502 is assigned to be a class 1 roadway, while second roadway 504 is assigned to be a class 4 roadway. Using this arrangement, the sizes of intersecting roadways can be assigned relative numerical values between 1 and 5 for purposes of estimating the type of intersection control used at the intersection.

For purposes of clarity, the current embodiments illustrate intersections comprising two roadways. In other embodiments, however, the procedures discussed above for classifying roadways can be applied to intersections with three or more roadways.

Figure 6:
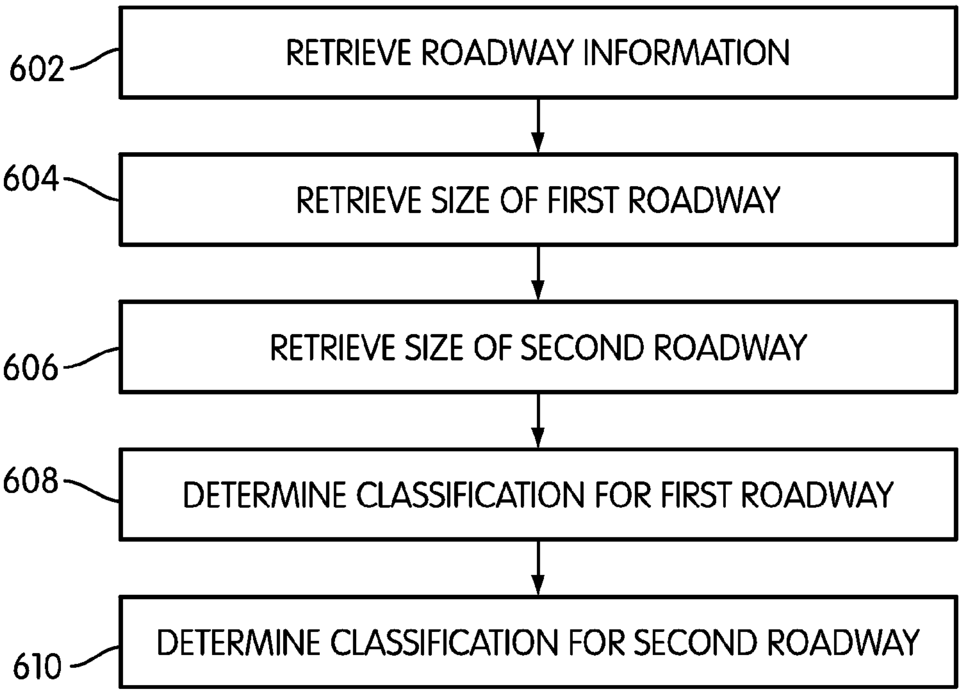
FIG. 6 is an embodiment of a process for classifying two roadways according to size at an intersection.

FIG. 6 illustrates an embodiment of a process for classifying roadways at an intersection. In some embodiments, some of the following steps could be accomplished by a control system of a motor vehicle. In some cases, some of the following steps may be accomplished by an ECU of a motor vehicle. In other embodiments, some of the following steps could be accomplished by other components of a motor vehicle. It will be understood that in other embodiments one or more of the following steps may be optional.

During step 602, a control system may retrieve roadway information. This information can be retrieved from a database that is onboard or from a remote database. Next, during step 604, the control system may retrieve the size of the first roadway at the intersection. In some cases, the size of the roadway is stored along with various other kinds of roadway characteristics. In some cases, the size may be a roadway width. Moreover, the width can be retrieved directly or may be calculated using roadway boundary information. In embodiments where the roadway width is not stored in a database, the roadway width could be approximated using other stored information associated with the roadway. Next, during step 606, the control system may retrieve the size of the second roadway.

Following step 606, during step 608, the control system may determine a classification for the first roadway. Generally, any process can be used for classifying a roadway. In some cases, the size of the roadway can be input into an algorithm that outputs a classification value, such as a numerical value that identifies a particular class of roadways. In other cases, a look up table may be used to select a particular class of roadways from the size of the roadway. The look up table could store various size ranges for each class of roadway. Following step 608, during step 610, the control system may determine a classification for the second roadway. This may be accomplished using a similar process used during step 608.

Figure 7:
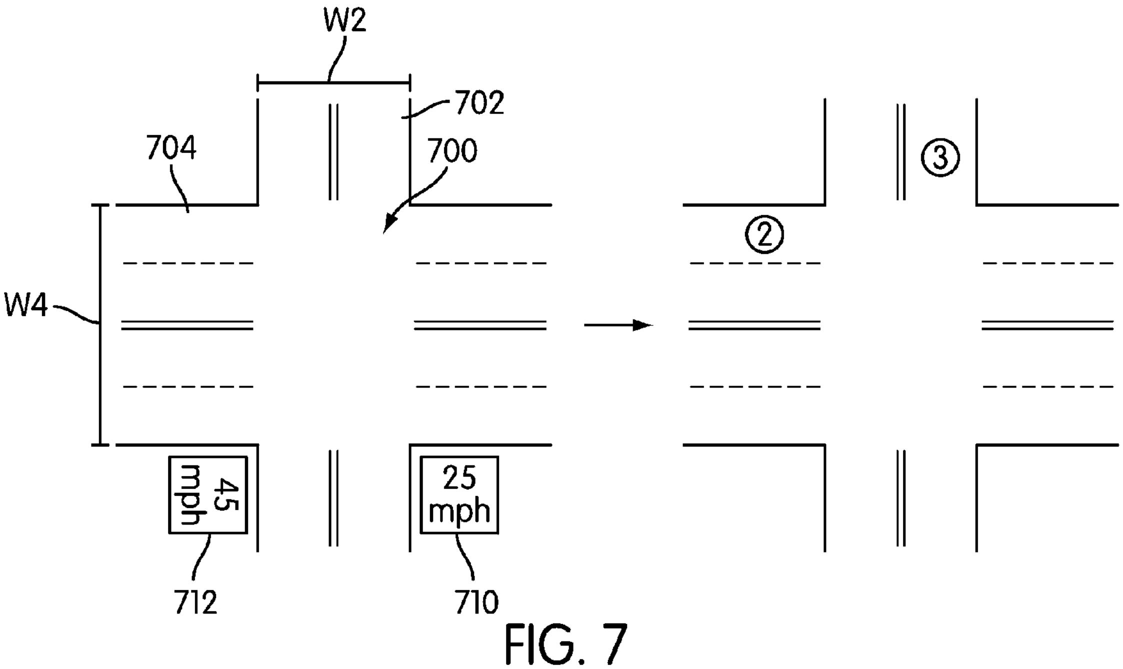
FIG. 7 is a schematic view of an embodiment of a method of classifying two roadways at an intersection according to various different roadway characteristics.

In other embodiments, different roadway characteristics can be used to classify a roadway. FIG. 7 illustrates a schematic view of a method of classifying roadways at an intersection using different roadway characteristics. Referring to FIG. 7, intersection 700 is formed by first roadway 702 and second roadway 704. First roadway 702 is a smaller roadway that crosses over second roadway 704. First roadway 702 and second roadway 704 could be classified according to various roadway characteristics including size, lane count, traveling speed as well as other characteristics. For example, using a size based classification scheme, first roadway 702 has width W2 and second roadway 704 has width W4. Based on these widths, first roadway 702 is classified as a class 3 roadway, while second roadway 704 is classified as a class 2 roadway.

First roadway 702 and second roadway 704 may also be classified according to traveling speed. In this situation, roadways with the highest traveling speeds are assigned to class 1 roadways, while roadways with the lowest traveling speeds are assigned to class 5 roadways. For example, first roadway 702 is associated with traveling speed 710 while second roadway 704 is associated with traveling speed 712. In this case, traveling speed 710 has a value of 25 mph and traveling speed 712 has a value of 45 mph. In other words, traveling speed 712 is greater than traveling speed 710. Using this information, first roadway 702 is classified as a class 3 roadway, while second roadway 704 is classified as a class 2 roadway.

In addition, first roadway 702 and second roadway 704 could be classified according to lane count, or the number of lanes of each roadway. In this case, first roadway 702 has two lanes while second roadway 704 has four lanes. Based on this information, first roadway 702 may be classified as a class 3 roadway, while second roadway 704 may be classified as a class 2 roadway.

Each of these different classification schemes provides a different but consistent method of dividing roadways into different classes that range from major roadways to minor roadways. Using this arrangement, a control system can estimate the type of traffic control devices used for each roadway at an intersection, since control devices are usually selected based on the relative differences in size or traffic capacity of each roadway.

Figure 8:
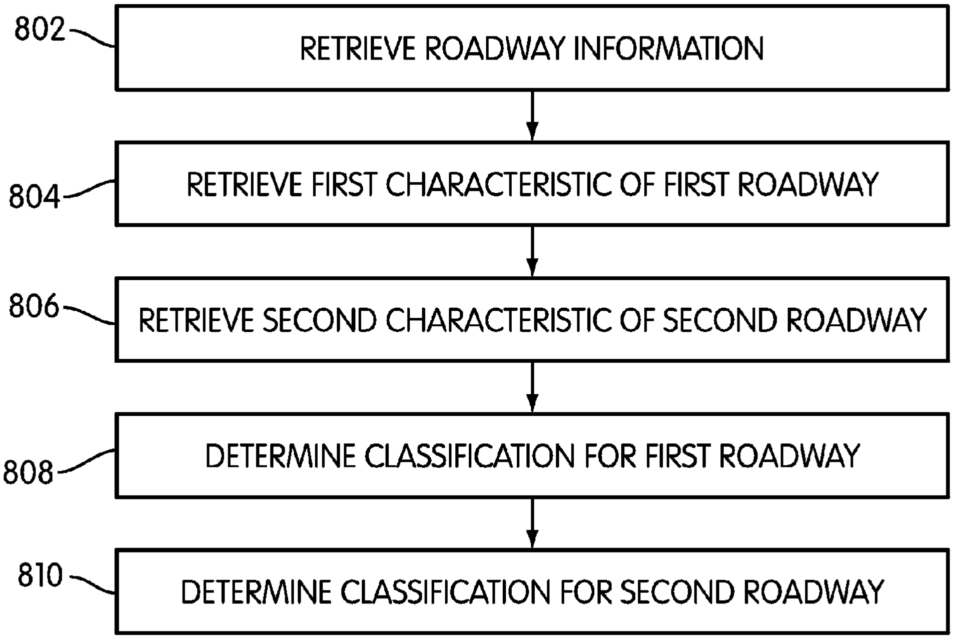
FIG. 8 is an embodiment of a process for determining classifications for two roadways according to particular roadway characteristics.

FIG. 8 illustrates an embodiment of a general process for determining the classification of one or more roadways using one or more roadway characteristics. In some embodiments, some of the following steps could be accomplished by a control system of a motor vehicle. In some cases, some of the following steps may be accomplished by an ECU of a motor vehicle. In other embodiments, some of the following steps could be accomplished by other components of a motor vehicle. It will be understood that in other embodiments one or more of the following steps may be optional.

During step 802, a control system may retrieve roadway information. This information can be retrieved from a database that is onboard or a remote database. Next, during step 804, the control system may retrieve a first characteristic of the first roadway at the intersection. The first characteristic can be any kind of characteristic including size, lane count, traveling speed as well as any other characteristics that may be used to classify a roadway. Next, during step 806, the control system may retrieve a second characteristic of the second roadway. The second characteristics may also be any kind of characteristic and in some embodiments may be a similar characteristic to the first characteristic. For example, in embodiments where the first characteristic is the number of lanes in the first roadway, the second characteristic may be the number of lanes in the second roadway.

Following step 806, during step 808, the control system may determine a classification for the first roadway. Generally, any process can be used for classifying a roadway. In some cases, a roadway characteristic can be input into an algorithm that outputs a classification value, such as a numerical value that identifies a particular class of roadways. In other cases, a look up table may be used to select a particular class of roadways from one or more roadway characteristics. The look up table could store various characteristic ranges for each class of roadway. Following step 808, during step 810, the control system may determine a classification for the second roadway. This may be accomplished using a similar process used during step 808.

FIGS. 9 through 12 illustrate schematic embodiments of a method of estimating intersection control devices for each roadway using the roadway classifications discussed above. Generally, the method of estimating intersection control devices may operate according to various rules that associate particular configurations of roadways with various types of intersection control. For example, in some cases, intersections between streets of lower classifications (classes 4 and 5 in these embodiments) may be associated with stop signs. Generally, a method may rely on many different rules for estimating intersection control type for each roadway at an intersection. Moreover, the types of rules used can vary according to the type of information that is available. In some cases, for example, intersection control type for a major street may be stored in a database, while no such intersection control type for an intersecting minor street may be stored. In such cases, different sets of rules can be used to estimate the type of intersection control for the minor roadway.

Figure 9:
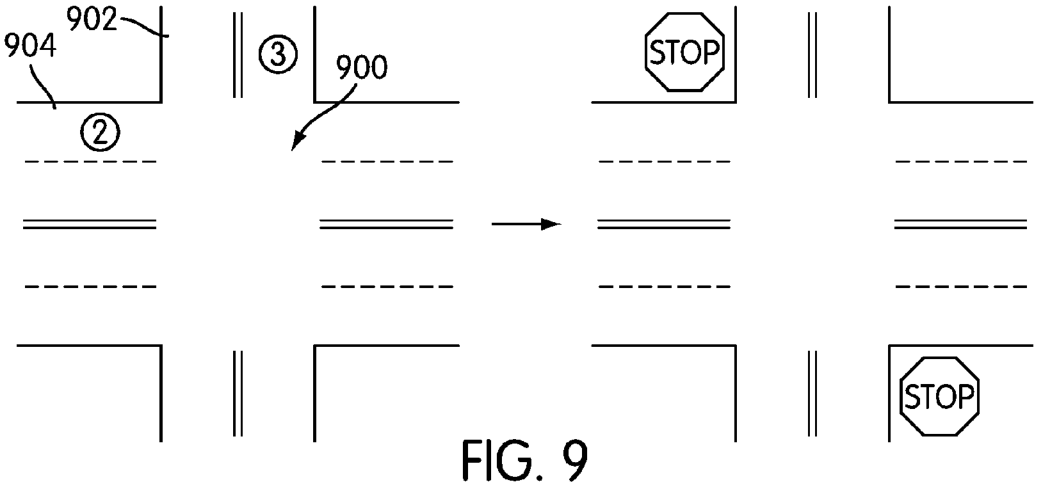
FIG. 9 is a schematic view of an embodiment of a method of estimating intersection control types for each roadway at an intersection according to the classification of each roadway, in which a first roadway is controlled by a stop-sign.

Referring to FIG. 9, intersection 900 includes first roadway 902 and second roadway 904 which have been assigned as a class 3 roadway and a class 2 roadway, respectively. By comparing the relative classes of each roadway, a control system may determine that first roadway 902 is controlled using stop signs. In addition, the control system may determine that there is no control device for second roadway 904. Using this arrangement, the control system may monitor the behavior of the host vehicle as well as any nearby target vehicles to determine if any stop sign violations may occur at intersection 900.

Figure 10:
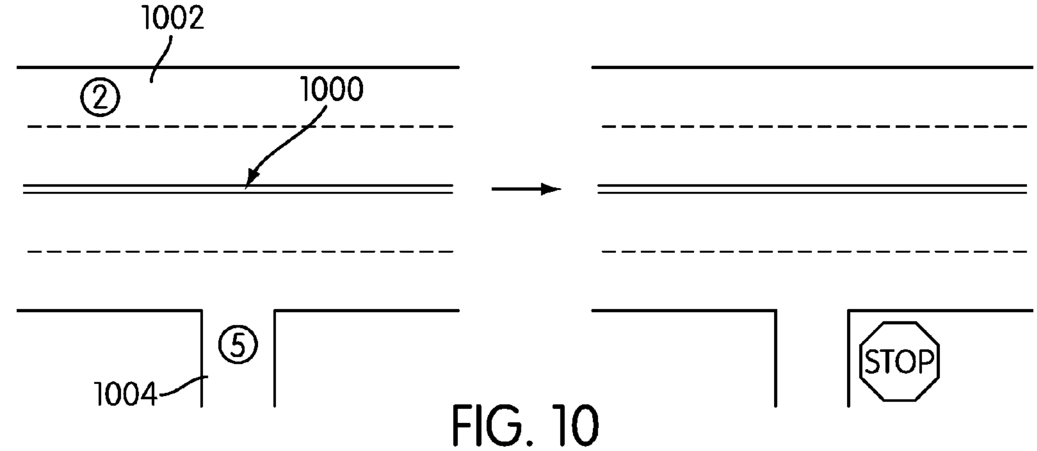
FIG. 10 is a schematic view of an embodiment of a method of estimating intersection control types for each roadway at an intersection according to the classification of each roadway, in which a minor roadway is controlled by a stop-sign.

Referring to FIG. 10, intersection 1000 includes first roadway 1002 and second roadway 1004, which are classified as a class 2 roadway and a class 5 roadway, respectively. In this scenario, the control system determines that second roadway 1004 is associated with a stop sign and first roadway 1002 is not associated with any intersection control device. Using this arrangement, the control system may monitor the behavior of the host vehicle as well as any nearby target vehicles to determine if any stop sign violations may occur at intersection 1000.

Figure 11:
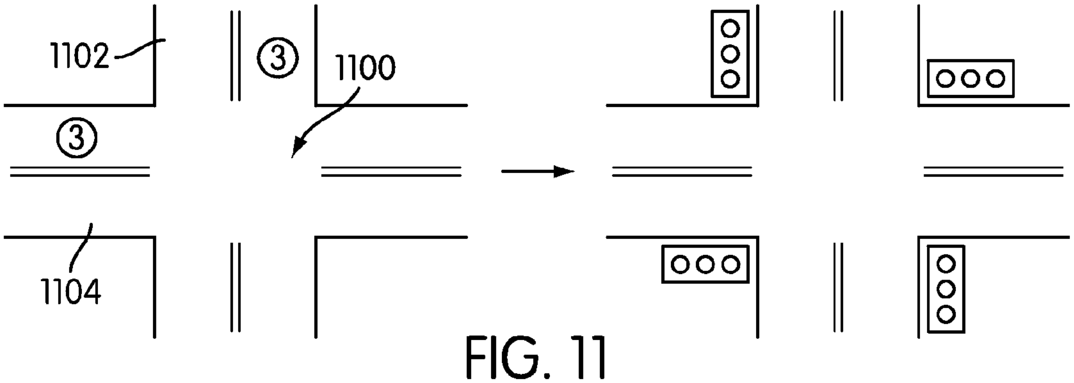
FIG. 11 is a schematic view of an embodiment of a method of estimating intersection control types for each roadway at an intersection according to the classification of each roadway, in which both roadways are controlled by traffic signals.

Referring to FIG. 11, intersection 1100 includes first roadway 1102 and second roadway 1104, which are both classified as class 3 roadways. In this scenario, the control system determines that both roadways are controlled by traffic signals. Using this arrangement, the control system may monitor the behavior of the host vehicle as well as any nearby target vehicles to determine if any traffic signal violations may occur at intersection 1100.

Figure 12:
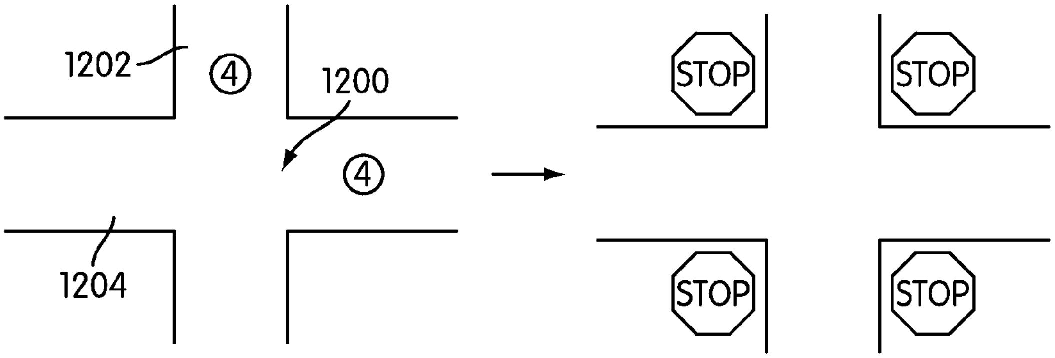
FIG. 12 is a schematic view of an embodiment of a method of estimating intersection control types for each roadway at an intersection according to the classification of each roadway, in which both roadways are controlled by stop-signs.

Referring to FIG. 12, intersection 1200 includes first roadway 1202 and second roadway 1204, which are both classified as class 4 roadways. In this scenario, the control system determines that both roadways are controlled using stop signs. Using this arrangement, the control system may monitor the behavior of the host vehicle as well as any nearby target vehicles to determine if any stop sign violations may occur at intersection 1200.

It will be understood that the methods discussed above are useful for estimating the types of intersection control devices used at an intersection. Therefore, in some case, a control system may operate one or more systems according to various different levels of confidence associated with a particular traffic control type estimation.

Figures 13, 14:
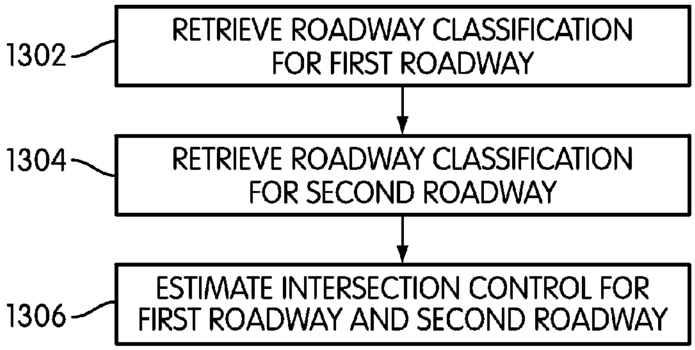
FIG. 13 is a schematic view of an embodiment of an intersection control table that may be used to estimate intersection control types for roadways at an intersection.
FIG. 14 is an embodiment of a process for estimating intersection control types for two roadways at an intersection.

FIG. 13 illustrates an exemplary embodiment of an intersection control table that could be utilized to estimate an intersection control type for each roadway at an intersection. The first two columns store various combinations of classes for the first roadway and the second roadway. The second two columns store different intersection control types for the first roadway and the second roadway. In some cases, a control system can use a look up table for retrieving the intersection control type for each roadway based on their relative classes. For example, the first row includes roadways of class 1 and class 4. This indicates a major highway that is intersected by a minor roadway. Based on these classifications, estimates for the types of intersection control for each roadway can be retrieved from the third and fourth columns. For example, according to the table, it is likely that the first roadway is not controlled and the second roadway is controlled using a stop sign. For purposes of clarity, only some exemplary configurations of roadway classes for two roadways are shown in the current embodiment. In other embodiments, other combinations of roadway classes could be stored. Furthermore, although the current embodiment uses a look up table, in other embodiments intersection control type can be determined using any other kind of algorithm or process.

FIG. 14 illustrates an embodiment of a method of estimating intersection control types for two roadways at an intersection. In some embodiments, some of the following steps could be accomplished by a control system of a motor vehicle. In some cases, some of the following steps may be accomplished by an ECU of a motor vehicle. In other embodiments, some of the following steps could be accomplished by other components of a motor vehicle. It will be understood that in other embodiments one or more of the following steps may be optional.

During step 1302, a control system may retrieve the roadway classification for the first roadway at an intersection. In some cases, the roadway classification may be stored in memory. Next, during step 1304, the control system may retrieve the roadway classification for the second roadway at an intersection. In some cases, this second roadway classification may be stored in memory. Following step 1304, during step 1306, the control system may estimate the intersection control for the first roadway and the second roadway. This can be accomplished using any type of algorithm, look up table or other method as discussed above.

A motor vehicle can include provisions for warning a driver when one or more vehicles are not behaving in an expected manner at an intersection controlled by one or more traffic control devices. In some cases, a control system may estimate one or more intersection control devices at an intersection and warn a driver about any potential violations of the intersection control devices.

Figure 15:
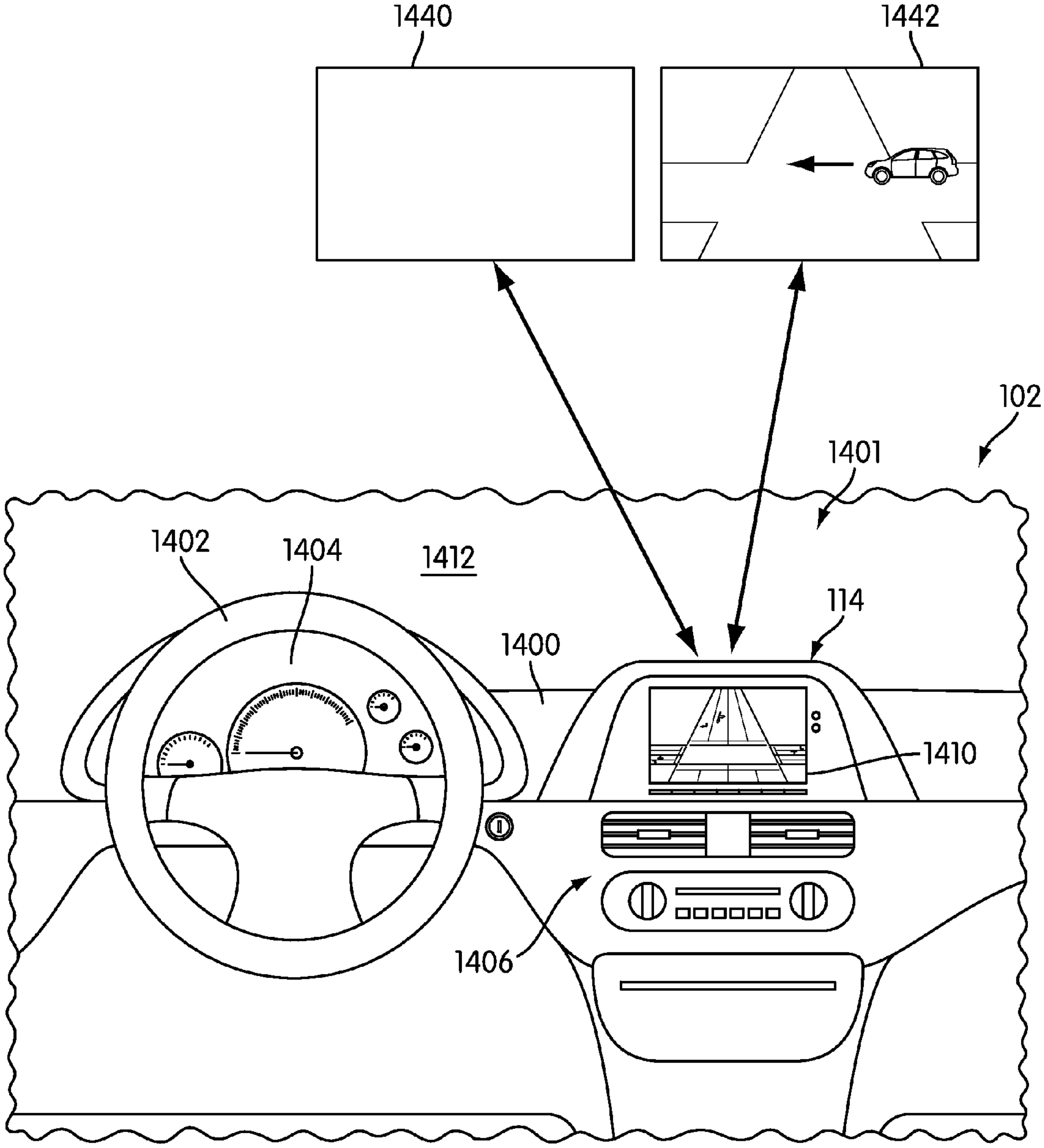
FIG. 15 is a front view of an embodiment of an interior of a motor vehicle including a warning system.

FIG. 15 illustrates an embodiment of dashboard 1400 for motor vehicle 102. Dashboard 1400 may include steering wheel 1402 and instrument panel 1404. In some embodiments, dashboard 1400 can further include center portion 1406. In some cases, center portion 1406 can include one or more devices associated with an interior of a motor vehicle. Examples include, but are not limited to: audio devices, video devices, navigation devices, as well as any other types of devices. In addition, center portion 1406 can be associated with controls for one or more systems of motor vehicle 102 including, but not limited to: climate control systems and other types of systems.

Motor vehicle 102 may include a warning system that provides information and/or alerts to a driver. In one embodiment, warning system 1401 can comprise one or more components including a processing unit as well as an interface for displaying and/or receiving information. In some cases, warning system 1401 may be associated with ECU 120, which is seen in FIG. 1. In addition, warning system 1401 can also be associated with driver vehicle interface 114 of motor vehicle 102. Moreover, in some cases, warning system 1401 can be associated with any other components of motor vehicle 102, including components not shown in the current embodiment.

A motor vehicle can include provisions for displaying information from a warning system. In some embodiments, a motor vehicle can include a display device of some kind. In some cases, a motor vehicle can include a video screen for displaying information from a warning system. Examples of display devices include, but are not limited to: LCDs, CRTs, ELDs, LEDs, OLEDs, HUDs, as well as other types of displays. In other cases, a display device could be a projection type display device that is configured to project an image onto one or more surfaces of motor vehicle 102. It will be understood that a display device may not be limited to a video screen or projection type display device.

In one embodiment, motor vehicle 102 can include display device 1410. In some cases, display device 1410 may be associated with driver vehicle interface 114 of motor vehicle 102. In particular, display device 1410 may be configured to present visual information received from motor vehicle 102. In an exemplary embodiment, display device 1410 may be an LCD screen.

In some embodiments, display device 1410 can be disposed within center portion 1406. However, it will be understood that in other embodiments, display device 1410 can be located in any portion of motor vehicle 102 as long as display device 1410 can be viewed by a driver. For example, in another embodiment, display device 1410 may be a projection-type device that displays an image onto front window 1412. In addition, while display device 1410 can be configured to present visual information received from motor vehicle 102, display device 1410 may be shared with other devices or systems within motor vehicle 102. For example, display device 1410 could also be used as a screen for a navigation system.

It will be understood that in some embodiments, a driver vehicle interface can include additional provisions beyond a display screen. For example, in another embodiment, a driver vehicle interface can also be associated with one or more input devices that allow a driver to control various aspects of a warning system. In some cases, a driver vehicle interface can include an on/off button for turning a warning system on and off. In still another embodiment, a driver vehicle interface can be associated with speakers for generating auditory information. In still other embodiments, a driver vehicle interface can be associated with haptic means, such as a pulsing brake pedal or a vibrating seat.

A display device for a warning system can be configured to display one or more images associated with various types of alerts of the warning system. For purposes of clarity, the following detailed description discusses a warning system using a warning alert. Although a single type of alert is used in the current embodiment, in other embodiments other types of alerts could also be used.

In the exemplary embodiment, motor vehicle 102 includes warning alert image 1442 that is associated with a warning alert. Warning alert image 1442 may comprise one or more symbols or icons. In this embodiment, warning alert image 1442 depicts an intersection with a vehicle entering the intersection. By displaying warning alert image 1442, a driver is alerted that a target vehicle is attempting to enter the intersection simultaneously with the host vehicle. This information may help a driver to be more aware of an approaching target vehicle as motor vehicle 102 approaches the upcoming intersection. Although a single image is shown for the warning alter image in the current embodiment, other embodiments can include more than one image for different kinds of alerts. Moreover, any combination of icons, images, words as well as colors can be used with a warning alert image.

In addition, a display device may be configured to display no image when no alert has been issued by motor vehicle 102. In this embodiment, display device 1410 displays default screen 1440 when no alert is issued. In the exemplary embodiment, default screen 1440 is associated with a blank screen of display device 1410. However, in embodiments where display device 1410 is used for displaying information from other systems, default screen 1440 may not be a blank screen. For example, in embodiments where display device 1410 is shared between a navigational system and motor vehicle 102, display device 1410 may continue to display images received from the navigation system until an alert is issued. Likewise, once an alert has expired, display device 1410 may return to displaying images from a navigation system.

It should be understood that a warning system can be used for various different purposes. For example, in some cases a warning system can be used to alert a driver about potential traffic control violations as well as for alerting a driver about potential collision threats posed by nearby vehicles. In still other embodiments, a warning system can be used for alerting a driver to various other kinds of safety issues.

Figure 16:
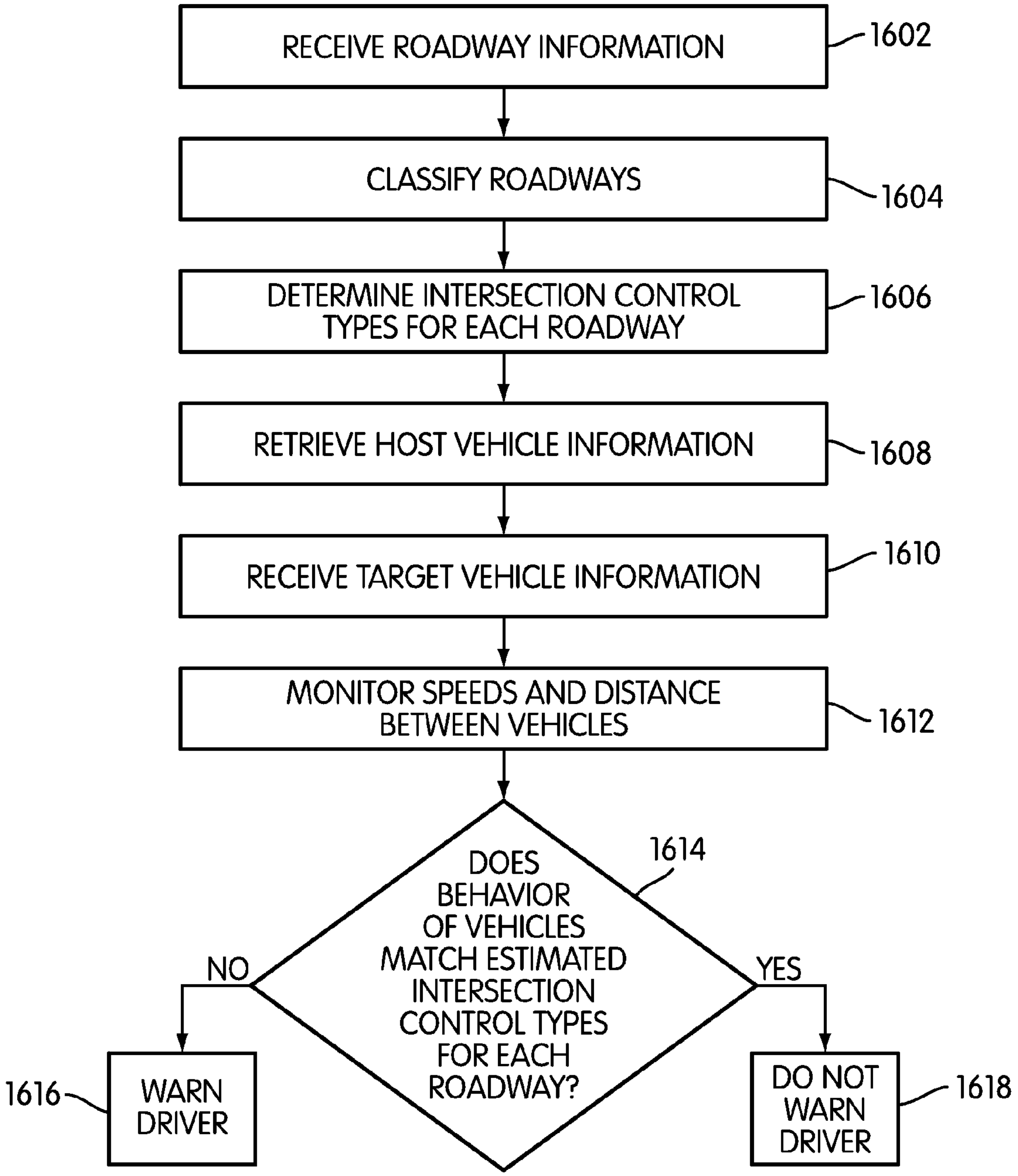
FIG. 16 is an embodiment of a process for controlling a warning system in a motor vehicle.

FIG. 16 illustrates an embodiment of process for controlling a warning system. In some embodiments, some of the following steps could be accomplished by a control system of a motor vehicle. In some cases, some of the following steps may be accomplished by an ECU of a motor vehicle. In other embodiments, some of the following steps could be accomplished by other components of a motor vehicle. It will be understood that in other embodiments one or more of the following steps may be optional.

During step 1602, a control system may receive roadway information. As previously discussed, this information can be received from an onboard database, a remote database or any other means for storing roadway information. Moreover, in some cases, roadway information could be sensed using one or more remote sensing devices including, but not limited to: cameras, radars, lidars as well as other remote sensing devices.

During step 1604, the control system may classify the roadways. The roadways may be classified according to relative sizes, traveling speeds, lane counts as well as any other parameters. Next, during step 1606, the control system may determine the intersection control types for each roadway. In particular, based on the class of each roadway determined during step 1604, the control system may determine if an intersection control device exists for each roadway. If a control device exists, the control system may estimate the type of device including, but not limited to: stop-signs, yield-signs, traffic signals as well as any other kinds of traffic control devices.

Following step 1606, during step 1608, the control system may retrieve host vehicle information. This may include vehicle speed and vehicle position. In some cases, the position may be determined using a GPS position for the host vehicle. Likewise, in some cases, the vehicle speed can be determined by detecting the position at multiple different times. In other cases, the vehicle speed can be measured directly using a vehicle speed sensor. Next, during step 1610, the control system may receive information from one or more target vehicles. The target vehicles may include any vehicles that are approaching an intersection that the host vehicle is approaching. In some cases, the control system may receive the target vehicle position and speed. This information can be sensed directly using a remote sensing device, or received through a vehicle communication network in which vehicles may transmit their locations, speeds as well as any other information to one another. In some cases, a target vehicle may transmit a current GPS location and the velocity can be calculated by analyzing the position over multiple times.

Next, during step 1612, the control system may monitor the speeds of the host vehicle and the target vehicles as well as the relative distances between the vehicles. Following this, the control system proceeds to step 1614. During step 1614, the control system determines if the behavior of each of the vehicles matches the estimated intersection control types for each roadway. In particular, the control system may determine if the speeds and positions of each vehicle are appropriate based on the assumed types of intersection control devices. For example, if a control system estimates that an intersection is controlled by a four way stop sign system, the control system expects each vehicles to slow as the vehicle approaches the intersection. If this behavior is confirmed, no warning may be given. However, if one or more vehicles does not appear to slow down, the control system may issue a warning alert to the driver. In situations where the host vehicle is expected to slow or stop and does not, the control system may issue an alert to warn the driver to slow or stop at the intersection.

If, during step 1614, the control system determines that the behavior of one or more vehicles is not appropriate for the estimated intersection control types, the control system may proceed to step 1616 where a warning is issued to the driver. However, if during step 1614 the control system determines that the behavior of the vehicles is appropriate for the estimated intersection control types, the control system may proceed to step 1618 where no warnings are issued to the driver.

Figure 17:
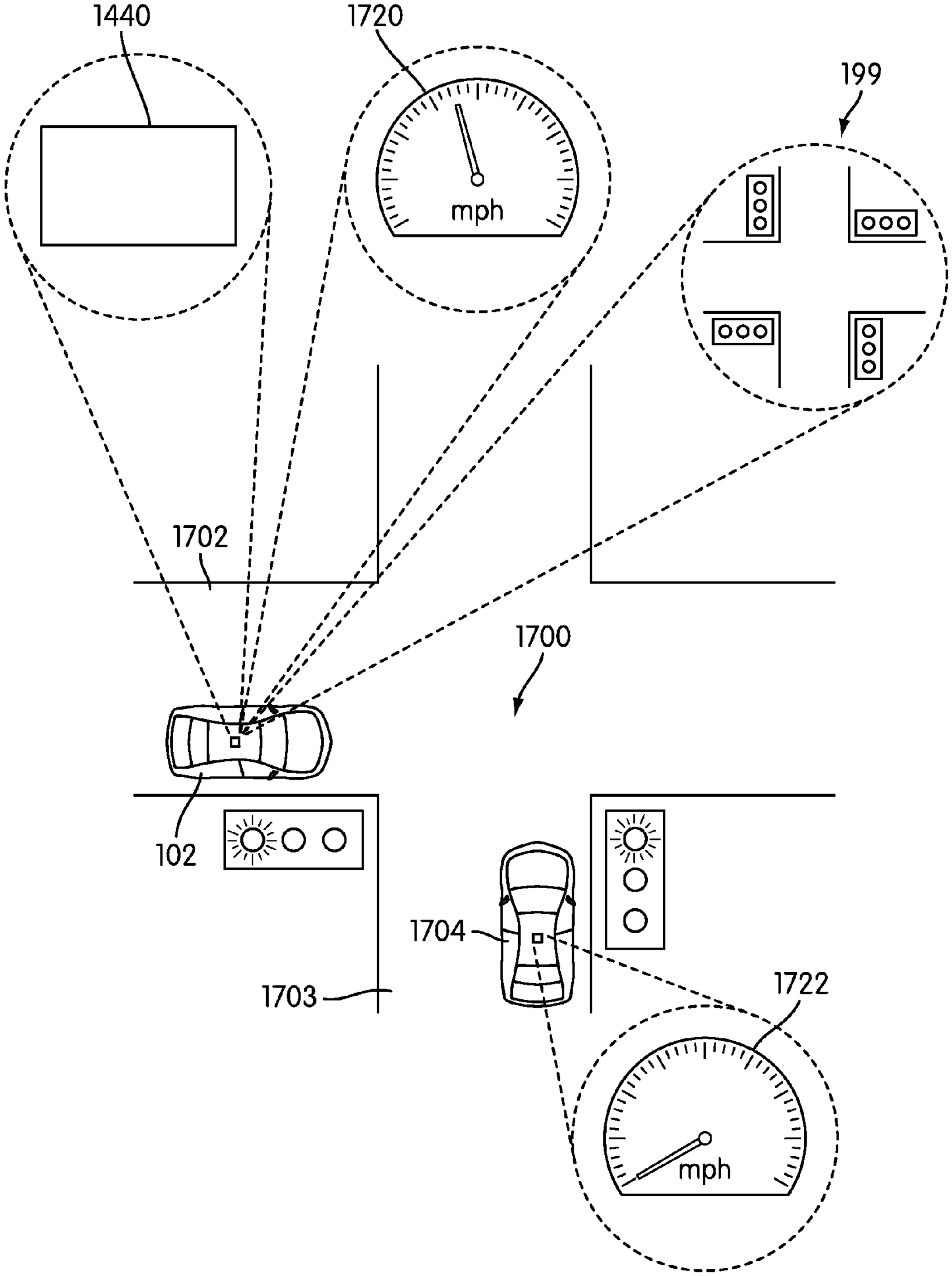
FIG. 17 is a schematic view of an embodiment of a process of controlling a warning system using an estimated intersection control type, in which no warning is provided.
Figure 18:
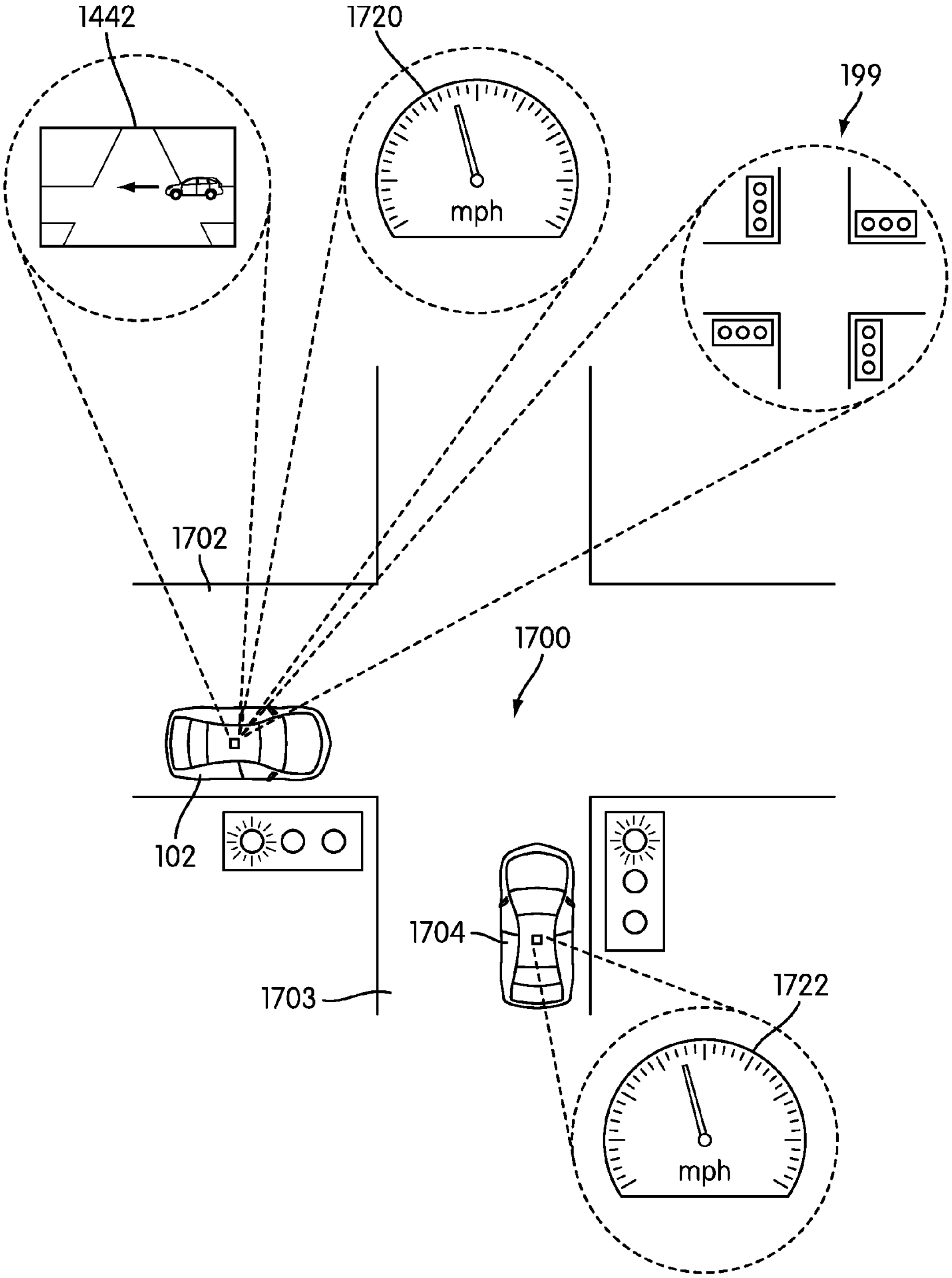
FIG. 18 is a schematic view of an embodiment of a process of controlling a warning system using an estimated intersection control type, in which a warning is provided.

FIGS. 17 and 18 illustrate an embodiment of a method of controlling motor vehicle 102. Referring to FIG. 17, motor vehicle 102, the host vehicle, is approaching intersection 1700 along first roadway 1702. Target vehicle 1704 is approaching intersection 1700 along second roadway 1703. In some cases, the speed and position of target vehicle 1704 may be received from a vehicle communication network, or directly sensed from a remote sensing device. In some cases, the speed and position of the host vehicle may be retrieved from a speed sensor and a GPS receiver.

In this case, the speed of both vehicles is monitored as indicated by first speedometer 1720 and second speedometer 1722. In addition, the intersection control types of first roadway 1702 and second roadway 1703 have been correctly estimated to be traffic signals according to the roadway characteristics of first roadway 1702 and second roadway 1703. Therefore, control system 199 expects that one vehicle will slow upon approaching intersection 1700 and the other vehicle will pass through intersection 1700 at a moderate speed. These expectations are confirmed by the relative speeds of motor vehicle 102 and target vehicle 1704. In particular, motor vehicle 102 is traveling towards intersection 1700 at a moderate speed, while target vehicle 1704 is slowing upon approaching intersection 1700. This occurs since motor vehicle 102 has a green light and target vehicle 1704 has a red light. In this situation, control system 199 does not issue any warning to the driver of motor vehicle 102 and default screen 1440 is displayed.

In contrast, the scenario shown in FIG. 18 is similar to the scenario of FIG. 17, except that in this case both motor vehicle 102 and target vehicle 1704 are approaching intersection 1700 without slowing down. Since control system 199 assumes that both roadways are controlled by traffic signals, control system 199 determines that the positions and speeds of motor vehicle 102 and target vehicle 1704 are not appropriate for these types of intersection control. Therefore, control system 199 may issue a warning to the driver of motor vehicle 102 to alert them to the potential threat. In particular, warning alert image 1442 is displayed.

FIGS. 17 and 18 are only intended to illustrate an exemplary embodiment of a method of controlling a warning system using estimations for the intersection control device along one or more roadways at an intersection. In other situations, a control system may monitor the behavior of a host vehicle and a target vehicle for various different configurations of intersection control devices at an intersection. For example, in embodiments where a control system determines that there is a four way stop sign system at an intersection, the control system may assume that both the host vehicle and target vehicle should slow upon approaching the intersection. Any deviations from this expected behavior may result in a warning alert being issued. In still other embodiments, a control system may be programmed with a variety of different expected behaviors for different configurations of intersection control devices at an intersection. These expected behaviors can be compared with the speeds and positions of the host and target vehicles to determine if any warnings should be issued.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A warning system for a motor vehicle, the warning system comprising:

at least one sensor for providing information associated with operating conditions of the motor vehicle;

a driver vehicle interface configured to provide information to a driver of the motor vehicle;

a warning interface configured to provide alerts or warnings to the driver of the motor vehicle;

at least one database configured to store roadway information associated with a plurality of roadways;

an electronic control unit (ECU) comprising at least one processor, the ECU being in communication with the at least one sensor, the driver vehicle interface, the warning interface, and the at least one database, wherein the ECU is configured to operate the warning system based on the roadway information by performing the steps of:

receiving information related to the motor vehicle at or near an intersection of a first roadway and a second roadway;

determining whether traffic control information associated with the intersection is stored in the at least one database;

wherein, upon determining that traffic control information is not available for the intersection, estimating a type of intersection control device associated with the intersection by retrieving a first characteristic of the first roadway from the at least one database, retrieving a second characteristic of the second roadway from the at least one database, associating the first roadway with a first class using the first characteristic to the select the first class from a plurality of classes according to a roadway classification scheme, associating the second roadway with a second class using the second characteristic to select the second class from the plurality of classes, comparing the first class and the second class, and determining the type of intersection control device based on the comparison of the first class and the second class, the intersection control device being associated with the first roadway, and further determining a type of intersection control device for the second roadway; and providing an alert to the driver of the motor vehicle using the warning interface regarding a potential violation of at least one of the intersection control device associated with first roadway and the intersection control device associated with the second roadway.

2. The warning system according to claim 1, further comprising a GPS receiver in communication with the ECU.

3. The warning system according to claim 1, wherein the warning interface comprises a display device.

4. The warning system according to claim 3, wherein the alert comprises a warning alert image configured for display on the display device.

5. The warning system according to claim 3, wherein the alert comprises at least one of an audible indicator, a visual indicator, and a haptic indicator.

6. The warning system according to claim 1, further comprising a DSRC antenna configured to transmit and receive information between one or more vehicles via a vehicle communication network, the DSRC antenna in communication with the ECU; and wherein the ECU determines the potential violation of at least one of the intersection control device associated with first roadway and the intersection control device associated with the second roadway using information associated with a target vehicle received from the DSRC antenna over the vehicle communication network.

7. The warning system according to claim 6, wherein the ECU is configured to:

provide a warning alert to the driver of the motor vehicle on the warning interface when the ECU determines the potential violation of at least one of the intersection control device associated with first roadway and the intersection control device associated with the second roadway.

8. The warning system according to claim 1, wherein the first characteristic and the second characteristic are selected from one or more of roadway size, number of lanes, and speed limit.

9. The warning system according to claim 1, wherein the plurality of classes according to the roadway classification scheme include two or more classes; and wherein each roadway is assigned to one of the two or more classes.

10. The warning system according to claim 9, wherein each roadway is classified by at least one of size or traffic capacity.

11. A warning system for a host motor vehicle, the warning system comprising:

at least one sensor for providing information associated with operating conditions of the host motor vehicle;

a DSRC antenna configured to transmit and receive information between one or more vehicles via a vehicle communication network;

a driver vehicle interface configured to provide information to a driver of the host motor vehicle;

a warning interface configured to provide alerts or warnings to the driver of the host motor vehicle;

at least one database configured to store roadway information associated with a plurality of roadways;

an electronic control unit (ECU) comprising at least one processor, the ECU being in communication with the at least one sensor, the DSRC antenna, the driver vehicle interface, the warning interface, and the at least one database, wherein the ECU is configured to operate the warning system based on the roadway information by performing the steps of:

receiving information related to the host motor vehicle at or near an intersection of a first roadway and a second roadway;

retrieving a first class for the first roadway from the at least one database, retrieving a second class for the second roadway from the at least one database, comparing the first class and the second class, determining a type of intersection control device for the first roadway and a type of intersection control device for the second roadway based on the comparison of the first class and the second class;

receiving information associated with a target vehicle from the DSRC antenna over the vehicle communication network; and controlling the warning interface of the host motor vehicle to inform the driver of a potential violation of at least one of the intersection control device associated with first roadway and the intersection control device associated with the second roadway based on the received information associated with the target vehicle.

12. The warning system according to claim 11, wherein the at least one database is disposed onboard the host motor vehicle.

13. The warning system according to claim 11, wherein the host motor vehicle is communication with a remote service provider.

14. The warning system according to claim 13, wherein the at least one database is located at the remote service provider.

15. The warning system according to claim 11, wherein the at least one sensor for providing information associated with operating conditions of the host motor vehicle comprises a GPS receiver in communication with the ECU.

16. The warning system according to claim 15, wherein the information related to the host motor vehicle at or near the intersection includes at least one of vehicle speed and vehicle position; and wherein the information associated with the target vehicle includes at least one of vehicle speed and vehicle position.

17. The warning system according to claim 16, wherein the ECU is configured to use the vehicle speed or vehicle position of the host motor vehicle and the vehicle speed or vehicle position of the target vehicle to determine the potential violation of at least one of the intersection control device associated with first roadway and the intersection control device associated with the second roadway.

18. The warning system according to claim 11, wherein the type of intersection control device includes at least one of a stop sign, a yield sign, and a traffic signal.

19. The warning system according to claim 11, wherein the driver interface and the warning interface are included with the ECU.

20. The warning system according to claim 11, wherein the warning interface includes a projection device that displays a warning image onto a front window of the host motor vehicle.

* * * * *